United States Patent
Ridgill et al.

(10) Patent No.: US 9,191,460 B2
(45) Date of Patent: Nov. 17, 2015

(54) SELECTIVE SUB-NET FILTERING IN A PRE-BOOT EXECUTION ENVIRONMENT (PXE)

(75) Inventors: Stephen P. Ridgill, Durham, NC (US); Stephen W. Murphrey, Apex, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 1177 days.

(21) Appl. No.: 11/610,774

(22) Filed: Dec. 14, 2006

(65) Prior Publication Data
US 2008/0147830 A1 Jun. 19, 2008

(51) Int. Cl.
G06F 15/177 (2006.01)
H04L 29/08 (2006.01)
G06F 9/44 (2006.01)

(52) U.S. Cl.
CPC ............. *H04L 67/34* (2013.01); *G06F 9/4416* (2013.01)

(58) Field of Classification Search
CPC .............................. H04L 67/34; G06F 9/4416
USPC .................... 709/217, 219, 220, 222; 713/1, 2
See application file for complete search history.

(56) References Cited

U.S. PATENT DOCUMENTS

| | | | |
|---|---|---|---|
| 6,735,692 B1 * | 5/2004 | Murphrey et al. ................. | 713/1 |
| 6,871,210 B1 | 3/2005 | Subramanian | |
| 6,954,852 B2 | 10/2005 | Burokas et al. | |
| 7,085,921 B2 * | 8/2006 | Frye, Jr. ............................ | 713/1 |
| 7,257,704 B2 * | 8/2007 | O'Neal ............................. | 713/2 |
| 2002/0161868 A1 * | 10/2002 | Paul et al. ...................... | 709/221 |
| 2005/0091387 A1 * | 4/2005 | Abe ................................ | 709/228 |
| 2005/0283606 A1 * | 12/2005 | Williams ...................... | 713/166 |
| 2007/0198820 A1 * | 8/2007 | Dickens et al. .................. | 713/2 |

OTHER PUBLICATIONS

IBM, PXE Subnet Filtering by DHCP Manipulation, Jul. 17, 2006, IP.com, 1st Edition, Abstract & pp. 1-2.*
Richichi, M., et al; Supporting Ubiquitous Computing Through Directory Enabled Technologies; 2001 SIGUCCS '01.

* cited by examiner

*Primary Examiner* — Peter Shaw
(74) *Attorney, Agent, or Firm* — Steven M. Greenberg, Esq.; CRGO Law

(57) ABSTRACT

Embodiments of the invention address deficiencies of the art in respect to PXE processing and provide a method, system and computer program product for selective PXE subnet filtering. In an embodiment of the invention, a PXE server subnet filtering method can be provided. The method can include selectively referring a PXE client to different boot logic depending upon at least a portion of a network assigned address for the PXE client. In this regard, selectively referring a PXE client to different boot logic depending upon at least a portion of a network assigned address for the PXE client can include selectively referring a PXE client to a different boot image notification layer (BINL) service providing a different filename for a different network bootstrap program depending upon at least a portion of an Internet protocol (IP) assigned address for the PXE client by a network resident dynamic host control protocol (DHCP) server in response to a previous DHCP request provided by the PXE client.

3 Claims, 2 Drawing Sheets

SELECTIVE SUB-NET FILTERING IN A PRE-BOOT EXECUTION ENVIRONMENT (PXE)

BACKGROUND OF THE INVENTION

1. Field of the Invention

The present invention relates to the field of the pre-boot execution environment (PXE), and more particularly to multi-PXE server environments.

2. Description of the Related Art

Traditional computing networks have evolved from the terminal based mainframe and minicomputer environment, to client-server networks and local area network deployments where one or more rich clients maintained a network connection to one or more network servers—generally a file server. With the advent of cost-effective broadband communications, wide-area networks and interlinked local area networks forming the backbone of the enterprise have enabled massive computing deployments across a geographically diverse landscape. Of course, maintaining the configuration of different rich clients in the modern enterprise has become so complex as to have necessitated entire departments of IT managers.

PXE is a technology intended to simplify the management of client computing devices in the enterprise. PXE refers to the on-demand distribution of a boot environment to entire farms of client computing devices. Intended to facilitate the management of a multiplicity of client endpoints in a dynamic information technology (IT) setting, PXE delivers a maintenance friendly circumstance for IT managers overseeing hundreds and thousands of client computing platforms. In consequence of PXE, a uniform boot environment can be applied simultaneously to scores of enabled client endpoints without requiring the physical configuration of each endpoint by human personnel.

Generally, in a PXE configuration, as a client computer powers up, the client computer seeks an Internet protocol (IP) address from a dynamic host configuration protocol (DHCP) server enabled to dynamically assign IP addresses to requesting endpoints through the DHCP. The request forwarded by the endpoint can include a PXE specific request for PXE processing. When receiving a PXE specified DHCP request from an endpoint, the DHCP server not only can assign an IP address to the endpoint, but also the DHCP server, acting as a PXE server, or a PXE server acting as a proxy DHCP server, can forward an address from which the endpoint, acting as a PXE client, can obtain suitable bootstrap logic for a customized boot environment. Thereafter, the PXE client can locate, obtain and execute the bootstrap logic as referenced the PXE server.

Importantly, in more complex configurations, it can be desirable to field different boot environments for different groupings of PXE clients. To achieve selective PXE processing of PXE requests, however, requires restraint on behalf of the different PXE servers to respond only to assigned PXE clients. At present, however, upon receiving a DHCP request from a PXE client, the PXE server will respond without regard to the identity of the PXE client.

To truly achieve selected PXE processing of a PXE client, each PXE server can be bound to an assigned PXE client by way of a media access control (MAC) address of the PXE client. Maintaining MAC addresses for every endpoint in a network, though, can be tedious and error prone. Though sub-net filtering selective PXE processing according to subnet addresses would be desirable, to do so requires knowledge of the IP address of each client, which is not possible prior to DHCP processing. Of course, upon completion of DHCP processing, only the first responding PXE server will be recognized by the PXE client and all other PXE servers will be ignored. This could be the "wrong" PXE server not intended by the user.

BRIEF SUMMARY OF THE INVENTION

Embodiments of the invention address deficiencies of the art in respect to PXE processing and provide a novel and non-obvious method, system and computer program product for selective PXE subnet filtering. In an embodiment of the invention, a PXE server subnet filtering method can be provided. The method can include selectively referring a PXE client to different boot logic depending upon at least a portion of a network assigned address for the PXE client. In this regard, selectively referring a PXE client to different boot logic depending upon at least a portion of a network assigned address for the PXE client can include selectively referring a PXE client to a different boot image notification layer (BINL) service providing a different filename for a different network bootstrap program depending upon at least a portion of an Internet protocol (IP) assigned address for the PXE client by a network resident dynamic host control protocol (DHCP) server in response to a previous DHCP request provided by the PXE client.

In another embodiment of the invention, a PXE subnet filtering data processing system can be provided. The system can include a PXE client and multiple different PXE servers communicatively coupled to the PXE client. The system further can include PXE client pre-boot logic coupled to the PXE client system. The can include program code enabled to obtain a network address prior to broadcasting a PXE request in a subsequent network address request. In this regard, each PXE server can include a proxy DHCP server configured to select from among different BINL services depending upon a subnet in a network address in a PXE request.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for PXE server selective subnet filtering. In accordance with an embodiment of the present invention, a PXE client can broadcast a request for an IP address without concurrently broadcasting a PXE request. Once the PXE client has assigned an IP address, the PXE client can broadcast a PXE request along with the assigned IP address. Thereafter, each of the PXE servers can filter the IP address to determine whether or not to respond. Consequently, only the assigned PXE server need service the PXE request. In this way, PXE server selective subnet filtering can be achieved in a PXE environment.

Figure 1:
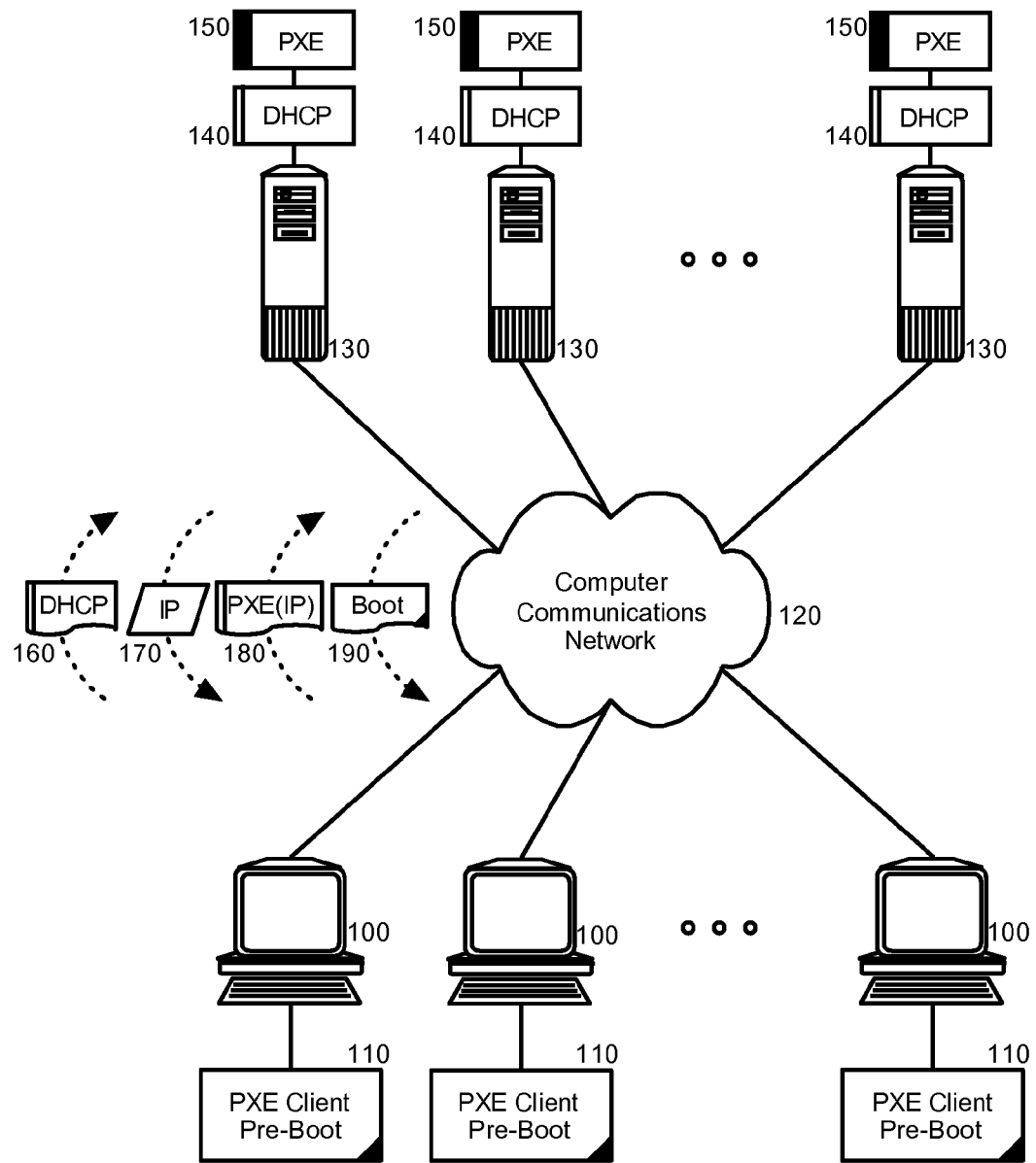
FIG. 1 is a schematic illustration of a PXE environment configured for PXE server selective subnet filtering; and, FIG. 2 is a flow chart illustrating a process for selective subnet filtering in a PXE environment.

In further illustration, FIG. 1 is a schematic illustration of a PXE environment configured for PXE server selective subnet filtering. The environment can include multiple different client endpoints 100 each coupled to multiple server endpoints 130 over computer communications network 120. Each client end point 100 can include PXE client pre-boot logic 110 whereas each server endpoint 130 can include both a DHCP server 140 and a PXE server 150. The DHCP server 140 can be configured to respond to DHCP requests from the client endpoints 100 by assigning respective IP addresses to requesting ones of the client endpoints 100. The PXE server 150, in turn, can be configured to respond to PXE requests from client endpoints 100 by returning a reference to a source of boot logic. Notably, each PXE server 150 can selectively respond to a received PXE request dependent upon at least a portion of an IP address provided by a requesting client endpoint 100.

To ensure that an IP address can be provided in conjunction with a PXE request, each client endpoint 100 first must acquire an IP address separate from the PXE request. To that end, the PXE client pre-boot logic 110 can include program code enabled to initially only broadcast a DHCP request 160 in response to which an IP address 170 can be provided by any of the DHCP servers 140 on a first come first serve basis. The PXE client pre-boot logic 110 further can include program code enabled subsequently to broadcast a new DHCP request 180 with a PXE request and the assigned IP address 170 embedded therein. Unlike the initial broadcast DHCP request 160, however, only a selected one of the PXE servers 150 will respond with a reference of boot logic 190 based upon a server-side filtering of the IP address 170.

Figure 2:
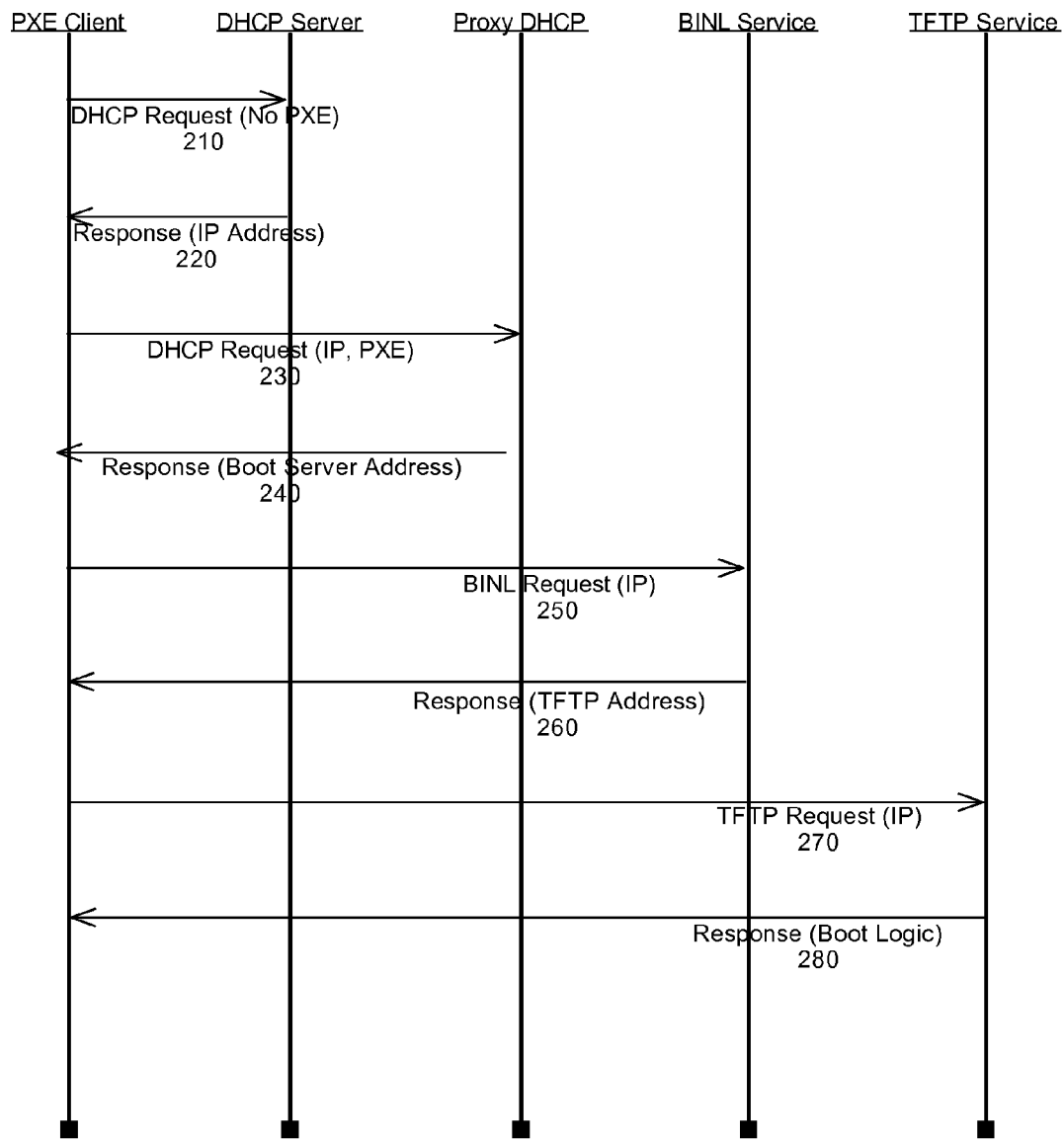

In further illustration, FIG. 2 is a communications diagram illustrating a process for selective subnet filtering in a PXE environment. Beginning in path 210, a PXE client can issue an initial DHCP request 210. The initial DHCP request can exclude a PXEClient tag in option 60 of the DHCP request. Thereafter, in path 220 a response to the DHCP request can be provided by a first responding DHCP server. The response can include an assigned IP address for the PXE Client. Using the IP address, in path 230 a new DHCP request can be broadcast containing both the IP address of the PXE Client and a PXEClient tag in option 60 of the DHCP request.

Upon receipt of the DHCP request with the PXEClient tag in option 60 of the DHCP request, each Proxy DHCP Server for the PXE Server can filter the IP address to identify a subnet. If the subnet has not been assigned to the PXE Server, the DHCP request can be ignored. Otherwise, in path 240 a response to the request can be returned to the PXE Client containing a boot server address. In block 250, the PXE Client can issue a BINL request to a BINL Service at the address provided by the Proxy DHCP Server.

In block 260, the BINL Service can respond with a file name for a network bootstrap program provided by a trivial file transfer protocol (TFTP) Service. Thereafter, in path 270 a TFTP request can be issued for the file name to the TFTP Service and in path 280, the TFTP Service can respond with the network boot program. Finally, the PXE Client can execute the network boot program to achieve bootstrap.

Importantly, the network boot program can vary according to subnet and the Proxy DHCP Server can selectively provide different references to correspondingly different BINL Services depending upon an identified subnet for the PXE Client.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A pre-boot execution environment (PXE) server subnet filtering method in a computer system, the method comprising:

excluding a PXE option from a first address request issued by the PXE client;

broadcasting the first address request to at least one dynamic hog control protocol (DHCP) server and receiving in response an assigned network address;

including a PXE option in a second address request issued by the PXE client along with the assigned network address;

broadcasting the second address request to multiple different PXE servers and receiving in response from a single one of the PXE servers a reference to boot logic depending upon at least a portion of the assigned network address; and, retrieving and executing the boot logic in the PXE client, the boot logic comprising program code initially only broadcasting a DHCP request and subsequently receiving an IP address assigned by one of the at least one DHCP server, creating a new DHCP request including both a PXE request and the assigned IP address and broadcasting the new DHCP request.

2. The method of claim 1, wherein broadcasting the second address request comprises:
   broadcasting the second address request to multiple different PXE servers and receiving in response from a single one of the PXE servers a reference to a BNL service depending upon at least a portion of the assigned network address;
   requesting a path and the name for a network boot program from the BIL service and receiving the path and the name in response; and,
   wherein retrieving comprises:
      retrieving and executing the network boot program corresponding to the path and the name in the PXE client.

3. A computer program product comprising a computer readable storage medium embodying computer usable program code for pre-boot execution environment (PXE) server subnet filtering, the computer program product comprising:
   computer usable program code for excluding a FXE option from a first address request issued by the PXE client;
   computer usable program code for broadcasting the first address request to at least one dynamic host control protocol (DHCP) server and receiving in response an assigned network address;
   computer usable program code for including a PXE option in a second address request issued by the PXE client along with the assigned network address;
   computer usable program code for broadcasting the second address request to multiple different FXE servers and receiving in response from a single one of the PXE servers a reference to boot logic depending upon at least a portion of the assigned network address; and,
   computer usable program code for retrieving and executing the boot logic in the PXE client, the boot logic comprising program code
   initially only broadcasting a DHCP request and subsequently receiving an IP address assigned by one of the at least one DHCP server, creating a new DHCP request including both a PXE request and the assigned IP address and broadcasting the new DHCP request.

* * * * *